(12) United States Patent
Usami

(10) Patent No.: US 8,897,043 B2
(45) Date of Patent: Nov. 25, 2014

(54) POWER CONVERSION APPARATUS AND METHOD

(75) Inventor: Yutaka Usami, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 431 days.

(21) Appl. No.: 13/219,285

(22) Filed: Aug. 26, 2011

(65) Prior Publication Data

US 2012/0099356 A1    Apr. 26, 2012

(30) Foreign Application Priority Data

Oct. 20, 2010   (JP) ................................. 2010-235586

(51) Int. Cl.
*H02M 7/00* (2006.01)
*H02M 7/219* (2006.01)

(52) U.S. Cl.
CPC .................................... *H02M 7/219* (2013.01)
USPC ........................................................ 363/125

(58) Field of Classification Search
USPC ............. 363/16, 37, 44, 80, 84, 89, 125, 126, 363/131, 132
See application file for complete search history.

(56) References Cited

U.S. PATENT DOCUMENTS

| | | | | |
|---|---|---|---|---|
| 4,885,675 | A * | 12/1989 | Henze et al. | 363/26 |
| 6,734,641 | B2 * | 5/2004 | Shoji et al. | 315/291 |
| 8,406,020 | B2 * | 3/2013 | Chiba | 363/89 |

FOREIGN PATENT DOCUMENTS

| | | |
|---|---|---|
| JP | H01-117658 | 5/1989 |
| JP | 2001-178140 | 6/2001 |
| JP | 2007-110869 | 4/2007 |
| JP | 2008-289228 | 11/2008 |
| JP | 2008-295248 | 12/2008 |
| JP | 2010-114993 | 5/2010 |

OTHER PUBLICATIONS

Office Action dated Mar. 11, 2014, filed in corresponding Japanese Patent Application No. 2010-235586, with English translation.

* cited by examiner

*Primary Examiner* — Adolf Berhane
*Assistant Examiner* — Yemane Mehari
(74) *Attorney, Agent, or Firm* — Patterson & Sheridan LLP

(57) ABSTRACT

According to one embodiment, power conversion apparatus includes a converter and a controller. A converter receives an AC power as an input, and outputs a DC voltage by turning on and off a first switching element which operates when the AC power is positive, and a second switching element which operates when the AC power is negative. A controller receives an AC input voltage and alternating input current to the converter, and a DC output voltage from the converter, as an input, determines a pulse width of a first pulse signal to turn on the first switching element and a pulse width of a second pulse signal to turn on the second switching element, and outputs the first pulse signal and second pulse signal to the converter.

6 Claims, 9 Drawing Sheets

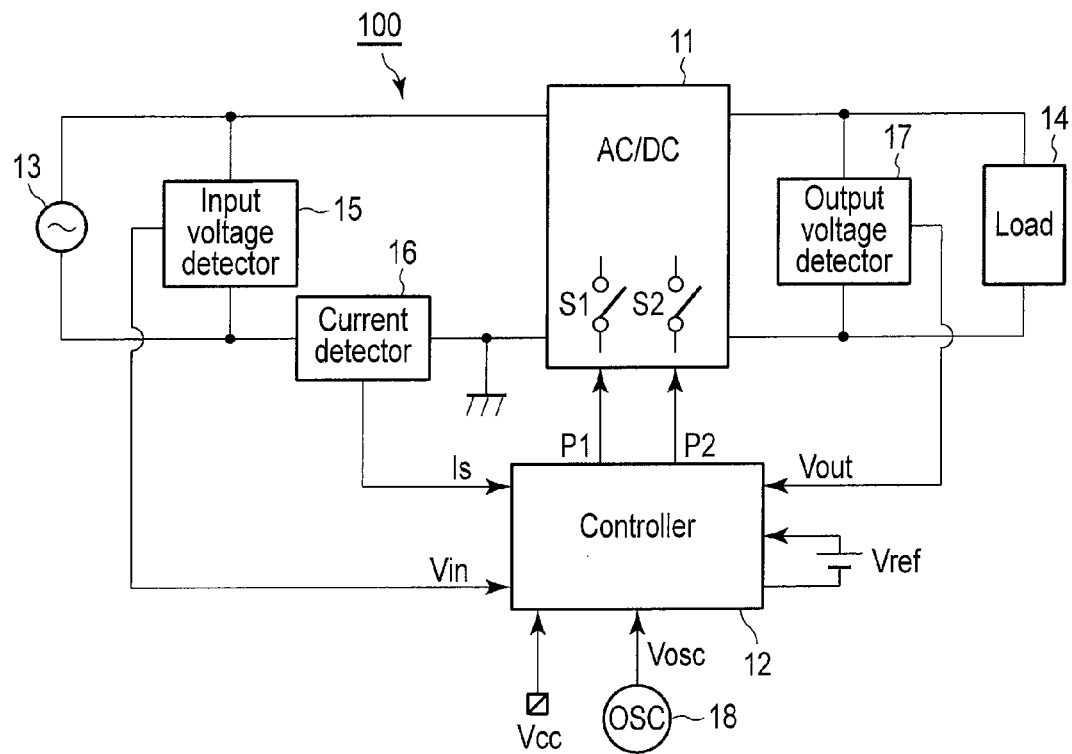
F I G. 1
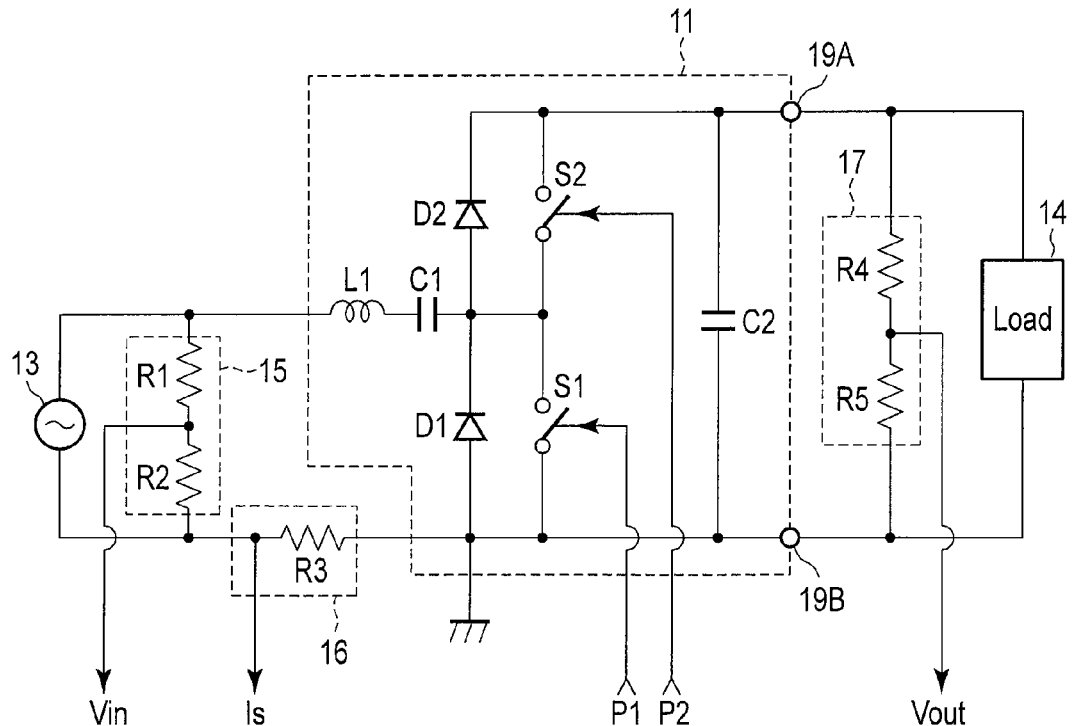
F I G. 2

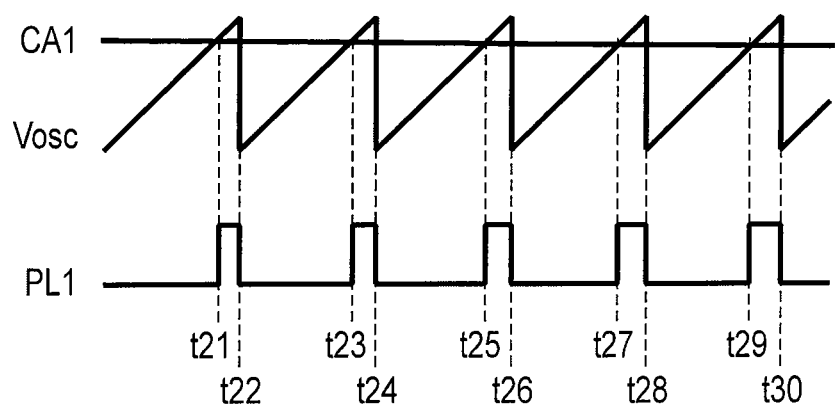
F I G. 6
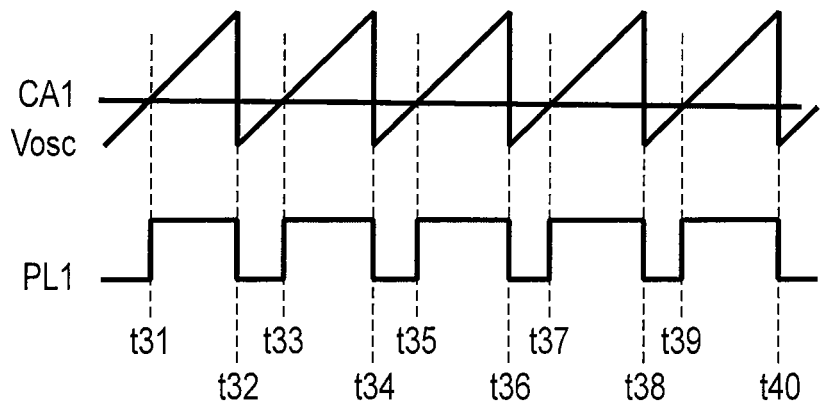
F I G. 7

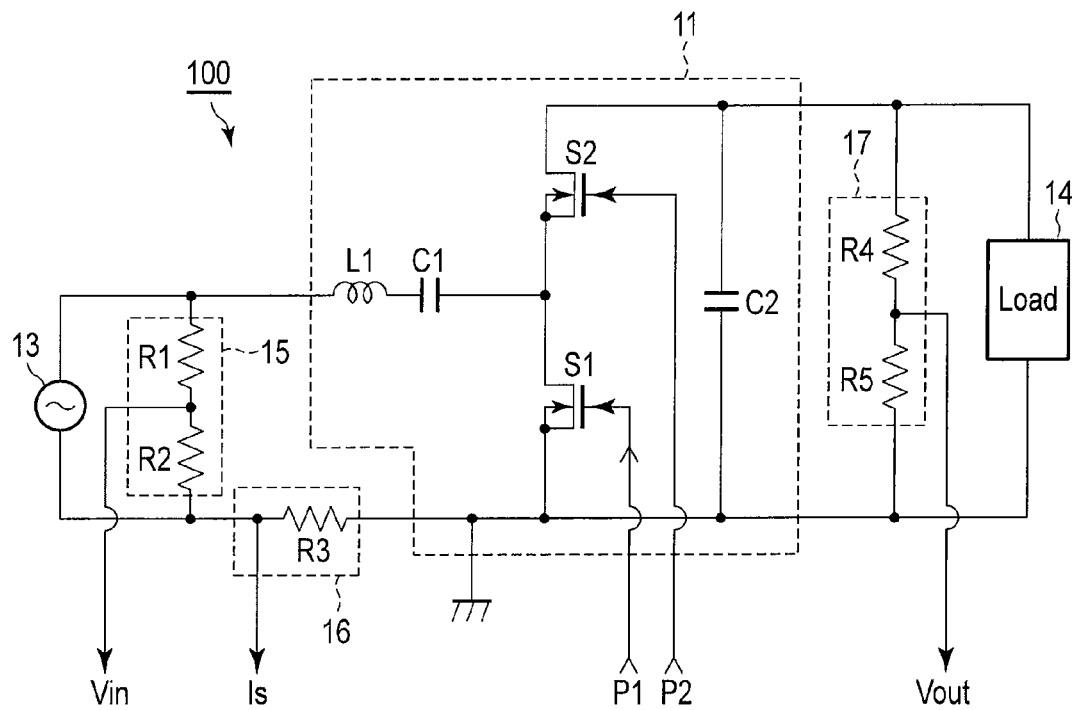
F I G. 12
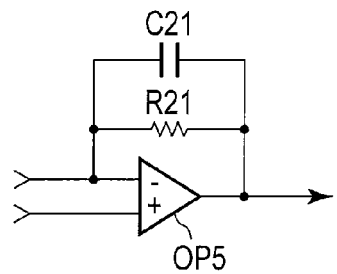
F I G. 13
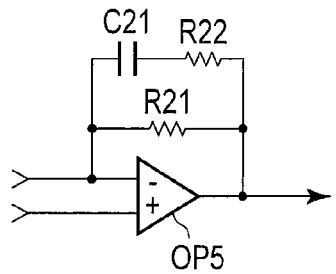
F I G. 14

POWER CONVERSION APPARATUS AND METHOD

CROSS-REFERENCE TO RELATED APPLICATIONS

This application is based upon and claims the benefit of priority from prior Japanese Patent Application No. 2010-235586, filed on Oct. 20, 2010, the entire contents of which are incorporated herein by reference.

FIELD

Embodiments described herein relate generally to a power conversion apparatus, which supplies power to a load by converting an AC voltage obtained from an AC power supply to a DC voltage.

BACKGROUND

A conventional power conversion apparatus for converting an AC voltage to a DC voltage includes a full-wave rectification circuit and a converter. A full-wave rectification circuit is connected to an AC power supply, and performs full-wave rectification of alternating current from an AC power supply. A converter converts the voltage full-wave rectified by a full-wave rectification circuit to a desired DC voltage. A converter supplies the DC voltage to a load.

As described above, a conventional power conversion apparatus obtains a desired DC voltage by applying a full-wave rectified alternating current to a converter. A diode bridge circuit is used for full-wave rectification. In a diode bridge circuit, a current always flows through a series circuit comprising two diodes regardless of whether an AC voltage is positive or negative. At this time, a power loss equivalent to the product of a current flowing through each diode and a forward voltage in a diode occurs in two diodes.

To prevent such a power loss, it is considerable to apply an alternating current to a converter without full-wave rectification. However, in such a case, an input voltage and input current to a converter are reverse in polarity, positive and negative.

A conventional power conversion apparatus applies a pulsating current or direct current after full-wave rectification. Thus, a converter may accept only a positive input voltage and current. In other words, a converter used in a conventional power conversion apparatus may not accept a negative input voltage and current. A power conversion apparatus able to apply an alternating current to a converter without full-wave rectification has not been realized.

BRIEF DESCRIPTION OF THE DRAWINGS

FIG. 1 is a schematic block diagram of a power conversion apparatus according to an embodiment;

FIG. 2 is a circuit diagram of a converter, an input voltage detector, a current detector, and an output voltage detector in the power conversion apparatus;

FIG. 6 is a diagram showing an example of a pulse signal PL1 generated when an amplified output signal CA1 is high in the power conversion apparatus;

FIG. 7 is a diagram showing an example of a pulse signal PL1 generated when an amplified output signal CA1 is low in the power conversion apparatus;

FIG. 12 is a circuit diagram of a modification of a converter;

FIG. 13 is a circuit diagram of a first modification of an inverting amplifier circuit; and FIG. 14 is a circuit diagram of a second modification of an inverting amplifier circuit.

DETAILED DESCRIPTION

Figure 3:
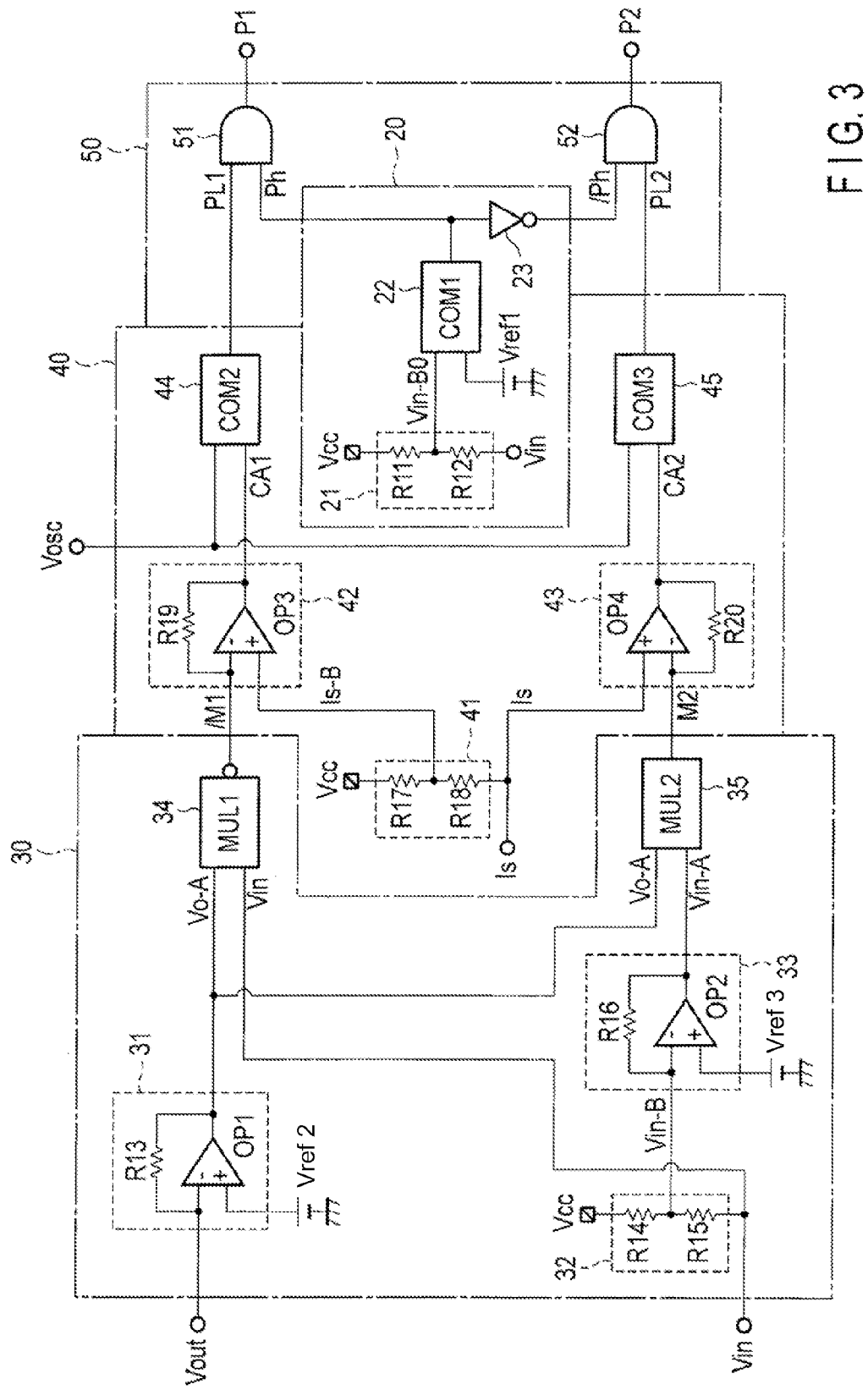
FIG. 3 is a circuit diagram of a controller in the power conversion apparatus.

In general, according to one embodiment, power conversion apparatus includes a converter and a controller. A converter receives an AC power as an input, and outputs a DC voltage by turning on and off a first switching element which operates when the AC power is positive, and a second switching element which operates when the AC power is negative. A controller receives an AC input voltage and alternating input current to the converter, and a DC output voltage from the converter, as an input, determines a pulse width of a first pulse signal to turn on the first switching element and a pulse width of a second pulse signal to turn on the second switching element, and outputs the first pulse signal and second pulse signal to the converter.

Hereinafter, embodiments of a power conversion apparatus will be explained with reference to the accompanying drawings.

FIG. 1 is a schematic block diagram of a power conversion apparatus 100. The power conversion apparatus 100 includes a converter 11 to convert an alternating current to a direct current, and a controller 12 to control the converter 11.

The power conversion apparatus 100 directly inputs an alternating current from an AC power supply 13 to the converter 11 without full-wave rectification. The converter 11 is provided with a first switching element S1, and a second switching element S2. The converter 11 converts an alternating current to a direct current by alternately turning on and off the switching elements S1 and S2 at a cycle faster than an alternating current. The power conversion apparatus 100 outputs a direct current obtained from the converter 11 to a load 14, thereby supplying power to the load 14.

In the power conversion apparatus 100, an input voltage detector 15 and a current detector 16 are connected to the input-side circuit of the converter 11, and an output voltage detector 17 is connected to the output-side circuit of the converter 11.

The input voltage detector 15 detects positive and negative voltages (AC input voltage Vin) generated at both ends of the AC power supply 13. The input voltage detector 15 outputs the detection signal to the controller 12.

The current detector 16 detects positive and negative currents (AC input current Is) flowing through a circuit connecting the AC power supply 13 and converter 11. The current detector 16 detects a circuit current downstream of ground potential GND viewed from the converter 11. The current detector 16 outputs the detection signal to the controller 12.

The output voltage detector 17 detects a positive voltage (DC output voltage Vout) generated across the output terminals of the converter 11. The output voltage detector 17 outputs the detection signal to the controller 12.

The controller 12 receives as an input the detection signal of AC input voltage Vin detected by the input voltage detector 15, the detection signal of alternating input current Is detected by the current detector 16, and the detection signal of DC output voltage Vout detected by the output voltage detector 17. The controller 12 connects a voltage source which supplies a rated voltage Vcc of 5 volts, for example, an oscillator 18 which generates a triangular periodic signal Vosc, and a voltage source which supplies an optional reference voltage Vref.

The controller 12 determines the pulse widths of a first pulse signal P1 to turn on and off the first switching element S1 and a second pulse signal P2 to turn on and off the second switching element S2. The pulse widths are determined based on the magnitudes of AC input voltage Vin, alternating input current Is, DC output voltage Vout, rated voltage Vcc, periodic signal Vosc, and reference voltage Vref. The controller 12 outputs the first and second pulse signals P1 and P2 to the converter 11, and controls turning on and off of the first and second switching elements S1 and S2.

FIGS. 2 and 3 are circuit diagrams of a power conversion apparatus 100. FIG. 2 shows a converter 11, an input voltage detector 15, a current detector 16, and an output voltage detector 17.

In the converter 11, a first switching element S1 is connected at both ends of an AC power supply 101 through an inductor L1 and capacitor C1 connected in series, and a second switching element S2 is connected at both ends of a first switching element S1 through a smoothing capacitor C2 connected in series. A mechanical switch is used for the first and second switching elements S1 and S2.

In the converter 11, a first diode D1 is externally connected in parallel with the first switching element S1, and a second diode D2 is externally connected in parallel with the second switching element S2. The anode of the first diode D1 is connected at a point connecting the first switching element S1 and AC power supply 101, and the cathode is connected at a point connecting the first switching element S1 and capacitor C1. The anode of the second diode D2 is connected at a point connecting the second switching element S2 and capacitor C1, and the cathode is connected at a point connecting the second switching element S2 and smoothing capacitor C2.

In the power conversion apparatus 100, the point a connecting the first switching element S1 of the converter 11 and the anode of the first diode D1 is used as ground potential GND. Both ends of the smoothing capacitor C2 are used as output terminals 19A and 19B of the converter 11. A desired load 14 is connected between the output terminals 19A and 19B.

The input voltage detector 15 comprises two voltage detection resistors R1 and R2 connected in series at both ends of the AC power supply 13. The input voltage detector 15 detects a potential difference generated between both ends of a series circuit comprising the resistors R1 and R2, and outputs the potential difference to the controller 12 as an AC input voltage Vin.

The current detector 16 comprises a current sensing resistor R3 inserted onto a circuit wiring connecting the point a and AC power supply 13. The current detector 16 detects a current flowing through the part close to the AC power supply 13 of the current sensing resistor R3, that is, downstream of ground potential GND, and outputs the detected current to the controller 12, as an alternating input current Is.

The output voltage detector 17 comprises two voltage detection resistors R4 and R5 connected in series between the output terminals 19A and 19B of the converter 11. The output voltage detector 17 detects a potential difference generated between both ends of a series circuit comprising the resistors R1 and R2, and outputs the potential difference to the controller 12 as a DC output voltage Vout.

FIG. 3 shows a controller 12. The controller 12 comprises a determination unit 20, a generator 30, a determinator 40, and a selector 50.

The determination unit 20 includes a first resistance voltage divider circuit 21 comprising resistors R11 and R12 connected in series, a first comparator 22, and an inverter 23.

The first resistance voltage divider circuit 21 divides a potential difference between the rated voltage Vcc and AC input voltage Vin by the resistors R11 and R12. The AC input voltage Vin-B0 biased to a positive potential by this voltage dividing is applied to one input terminal of the first comparator 22.

The first comparator 22 compares the AC input voltage Vin-B0 biased to a positive potential by the first resistance voltage divider circuit 21 with a preset first reference voltage Vref1. The first comparator 22 outputs a phase signal Ph corresponding to the comparison result. The phase signal Ph becomes logical 1 when the bias AC input voltage Vin-B0 is higher than the first reference voltage Vref1, and becomes logical 0 when the bias AC input voltage Vin-B0 is lower than the first reference voltage Vref1.

The phase signal Ph is output to the selector 50, and supplied to the inverter 23. The inverter 23 generates a logical NOT signal /Ph of the phase signal Ph output from the first comparator 22. The logical NOT signal /Ph is output to the selector 50.

Figure 4:
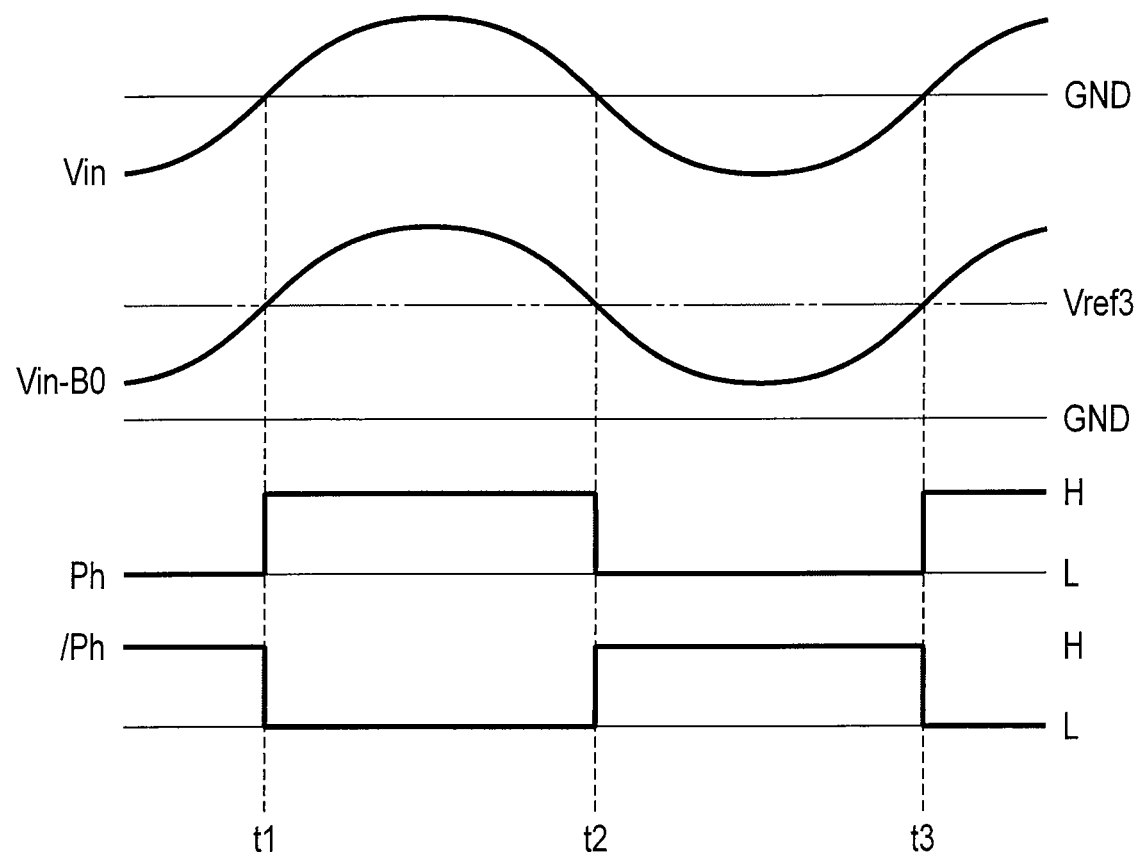
FIG. 4 is a waveform chart showing the relationship between an AC input voltage Vin, a bias AC input voltage Vin-B0, a phase signal Ph, and a logical NOT signal /Ph.

FIG. 4 is a waveform chart showing the relationship between an AC input voltage Vin, a bias AC input voltage Vin-B0, a phase signal Ph, and a logical NOT signal /Ph. The AC input voltage Vin cyclically becomes positive or negative on the basis of ground potential GND. The determination unit 20 divides a potential difference between the rated voltage Vcc and AC input voltage Vin by the first resistance divider circuit 21. Therefore, the AC input voltage Vin is biased to a positive bias AC input voltage Vin-B0.

For example, it is assumed that the bias AC input voltage Vin-B0 is biased to a positive potential so that it varies in a range of 2 to 3 volts around 2.5V. In this case, if the first reference voltage Vref is set to 2.5V, a logical 1 phase signal Ph is generated in a section where the AC input voltage Vin is positive, as sown in sections t1 and t2 in FIG. 4. On the other hand, as shown in sections t2 and t3, a logical 0 phase signal Ph is generated in a section where the AC input voltage Vin is negative. Therefore, the logical NOT signal /Ph becomes logical 0 in sections t1 and t2 where the AC input voltage Vin is positive, and becomes logical 1 in sections t2 and t3 where the AC input voltage Vin is negative. Here, the determination unit 20 determines the polarity of the AC input voltage Vin.

Returning to FIG. 3, the generator 30 includes an output voltage amplifier circuit 31, a second resistance divider circuit 32, an input voltage amplifier circuit 33, a first multiplexer 34, and a second multiplexer 35.

The output voltage amplifier circuit 31 comprises a first operational amplifier OP1, and a feedback resistor R13 which connects the output terminal and inverting terminal of the first operational amplifier OP1. The output voltage amplifier circuit 31 amplifies a voltage difference between a second reference voltage Vref2 applied to a non-inverting terminal of the first operational amplifier OP1 and a DC output voltage Vout applied to an inverting terminal. An output signal Vo-A amplified by the output voltage amplifier 31 is supplied to the first multiplexer 34 and second multiplexer 35.

The second resistance divider circuit 32 divides a potential difference between the rated voltage Vcc and AC input voltage Vin by resistors R14 and R15. The AC input voltage Vin-B biased to a positive potential by this voltage dividing is applied to the input voltage amplifier circuit 33.

The input voltage amplifier circuit 33 comprises a second operational amplifier OP2, and a feedback resistor R16 which connects the output terminal and inverting terminal of the second operational amplifier OP2. The input voltage amplifier circuit 33 amplifies a voltage difference between a third reference voltage Vref3 applied to a non-inverting terminal of the second operational amplifier OP2 and a bias AC input voltage Vin-B applied to an inverting terminal. An inverted amplified output signal Vin-A amplified by the input voltage amplifier 33 is output to the second multiplexer 35.

The first multiplexer 34 multiplies the amplified output signal Vo-A by the detection signal of the AC input voltage Vin. An inverted signal /M1 of the output signal equivalent to the multiplication result is output to the determinator 40. The second multiplexer 35 multiplies the amplified output signal Vo-A by the inverted amplified output signal Vin-A. An output signal M2 equivalent to the multiplication result is output to the determinator 40.

The results of the multiplications by the first and second multiplexers 34 and 35 become a current command value to control the alternating input current Is to be sinusoidal. In other words, the generator 30 generates current command signals /M1 and M2 to control the alternating input current Is to be sinusoidal, from the AC input voltage Vin and the difference voltage of the DC output voltage Vout to the second reference voltage Vref2.

The determinator 40 includes a third resistance divider circuit 41, a first current amplifier 42, a second current amplifier circuit 43, a second comparator 44, and a third comparator 45.

The third resistance divider circuit 41 divides a potential difference between the rated voltage Vcc and alternating input current Is is by resistors R17 and R18. A signal of the alternating input current Is-B biased to a positive potential by this voltage dividing is applied to the first current amplifier circuit 42.

The first current amplifier circuit 42 comprises a third operational amplifier OP3, and a feedback resistor R19 which connects the output terminal and inverting terminal of the third operational amplifier OP3. The first current amplifier circuit 42 outputs an amplified output signal CA1, so that the signal of the bias alternating input current Is-B applied to the non-inverting terminal of the third operational amplifier OP3 coincides with current command signal /M1 applied to the inverting terminal. Amplified output signal CA1 is supplied to the second comparator 44.

The second current amplifier circuit 43 comprises a fourth operational amplifier OP4, and a feedback resistor R20 which connects the output terminal and inverting terminal of the fourth operational amplifier OP4. The second current amplifier circuit 43 outputs an amplified output signal CA2, so that the detection signal of the alternating input current Is applied to the non-inverting terminal of the fourth operational amplifier OP4 coincides with current command signal M2 applied to the inverting terminal. Amplified output signal CA2 is supplied to the third comparator 45.

The second comparator 44 compares a triangular cyclic signal Vosc generated by the oscillator 18 with an amplified output signal CA1 of the first current amplifier circuit 42. Pulse signal PL1 corresponding to the comparison result of the second comparator 44 is output to the selector 50.

The third comparator 45 compares a triangular cyclic signal Vosc generated by the oscillator 18 with an amplified output signal CA2 of the second current amplifier circuit 43. Pulse signal PL2 corresponding to the comparison result of the third comparator 45 is output to the selector 50.

Pulse signal PL1 turns on when the cyclic signal Vosc increases to higher than amplified output signal CA1, and turns off when it decreases to lower than amplified output signal CA1. Pulse signal PL2 turns on when the cyclic signal Vosc increases to higher than amplified output signal CA2, and turns off when it decreases to lower than amplified output signal CA2.

The second comparator 44 constitutes a first pulse generation circuit, which generates a pulse signal PL1 whose pulse width is controlled by current amplified signal CA1 output from the first current amplifier circuit 42. The third comparator 45 constitutes a second pulse generation circuit, which generates a pulse signal PL2 whose pulse width is controlled by current amplified signal CA2 output from the second current amplifier circuit 43.

An explanation will be given of the operation waveforms of the generator 30 and determinator 40 of the controller 12 in both cases where the AC input voltage Vin is positive and negative. First, an explanation is given of the case where the AC input voltage Vin is positive, with reference to the waveform charts of FIGS. 5, 6 and 7.

Figure 5:
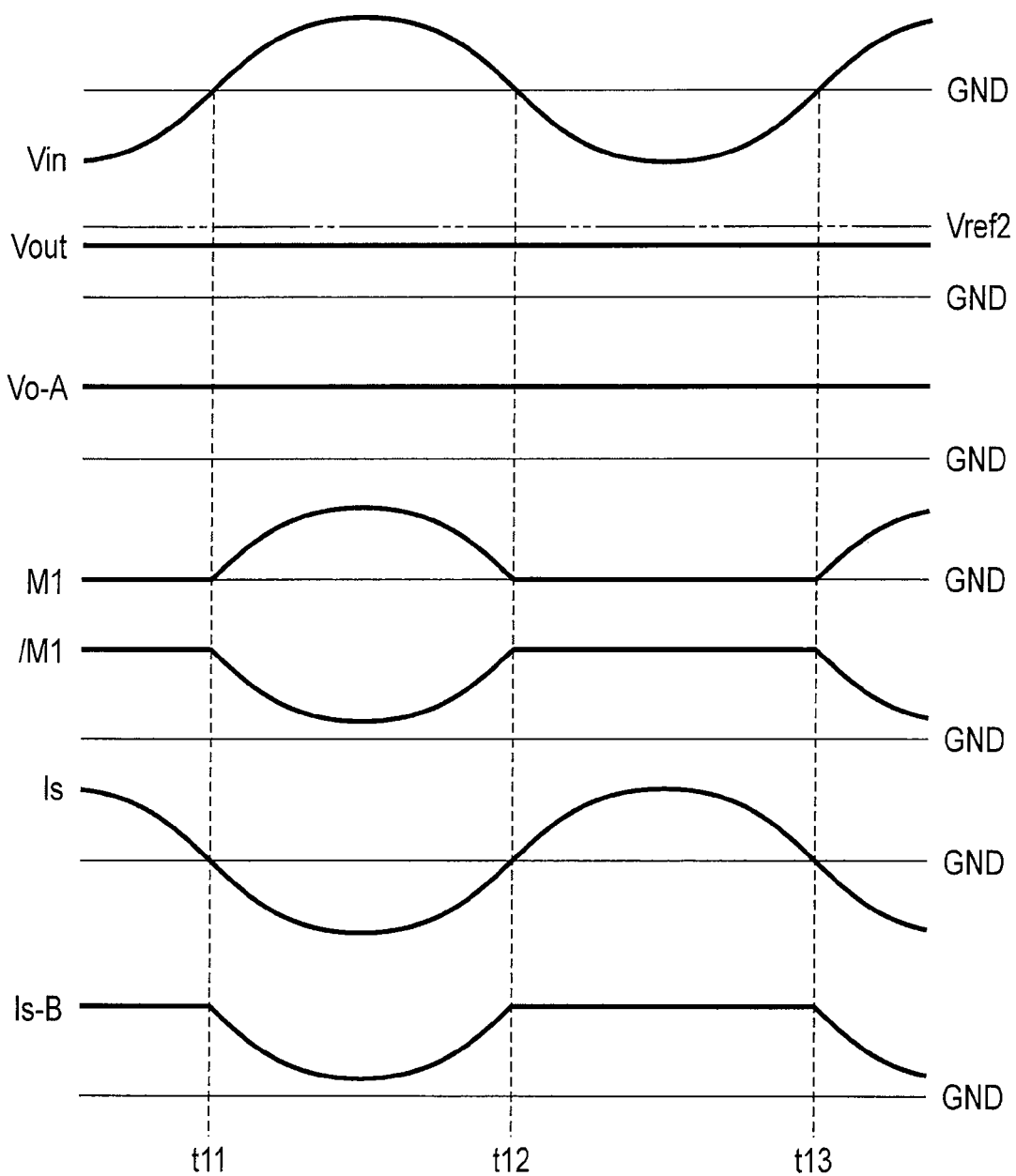
FIG. 5 is a diagram showing operation waveforms when an AC input voltage Vin to a generator and determinator of a controller is positive in the power conversion apparatus.

FIG. 5 shows waveforms of AC input voltage Vin, DC output voltage Vout, amplified output signal Vo-A, output signal M1 and inverting signal (current command signal) /M1 of a first multiplexer 34, AC input signal Is, and bias alternating input current Is-B, from the top to the bottom.

In FIG. 5, the DC output voltage Vout is lower than the second reference voltage Vref2. In this case, the output voltage amplifier circuit 31 outputs a high-level amplified output signal Vo-A. Therefore, the output signal M1 of the first multiplexer 34 becomes sinusoidal similar to the waveform of AC input voltage Vin.

The current detector 16 detects a circuit current downstream of ground potential GND. Therefore, in a section where the AC input voltage Vin is positive (t11 to t12 in FIG. 5), the detection signal of alternating input current Is becomes negative. The sinusoidal waveform of current command signal /M1 inverted from the output signal M1 becomes an envelope curve that is a target of the alternating input current Is in a positive section.

A negative detection signal cannot be used as it is. The third resistance divider circuit 41 generates a bias alternating input current Is-B by applying a positive bias voltage to the detection signal. The first current amplifier circuit 42 amplifies the difference between the bias alternating input current Is-B and current command signal /M1, and outputs an amplified output signal CA1. The level of amplified output signal CA1 is high when current command signal /M1 is higher than the bias alternating input current Is-B, and low when it is lower than the bias alternating input current Is-B.

The second comparator 44 compares the triangular cyclic signal Vosc generated by the oscillator 18 with amplified output signal CA1, and generates a pulse signal PL1. FIG. 6 shows an example of pulse signal PL1 generated when the level of amplified output signal CA1 is high. FIG. 7 shows an example of pulse signal PL1 generated when the level of amplified output signal CA1 is low.

Pulse signal PL1 turns on when the cyclic signal Vosc becomes higher than amplified output signal CA1 (at times t21, t23, t25, t27 and t29 in FIG. 6, and times t31, t33, t35, t37 and t39 in FIG. 7), and turns off when the cyclic signal Vosc becomes lower than amplified output signal CA1 (at times t22, t24, t26, t28 and t30 in FIG. 6, and times t32, t34, t36, t38 and t40 in FIG. 7).

As seen by comparing FIG. 6 and FIG. 7, the pulse width of pulse signal PL1 decreases when the level of amplified output signal CA1 is high, and increases when the level of amplified output signal CA1 is low.

In other words, the level of amplified output signal CA1 increases when the level of current command signal /M1 is higher than the level of the bias alternating input current Is-B, and the pulse width of pulse signal PL1 decreases. In contrast, the level of amplified output signal CA1 decreases when the level of current command signal /M1 is lower than the level of the bias alternating input current Is-B, and the pulse width of pulse signal PL1 increases.

Next, the case where the AC input voltage Vin is negative is explained with reference to the waveform charts of FIGS. 8, 9 and 10.

Figure 8:
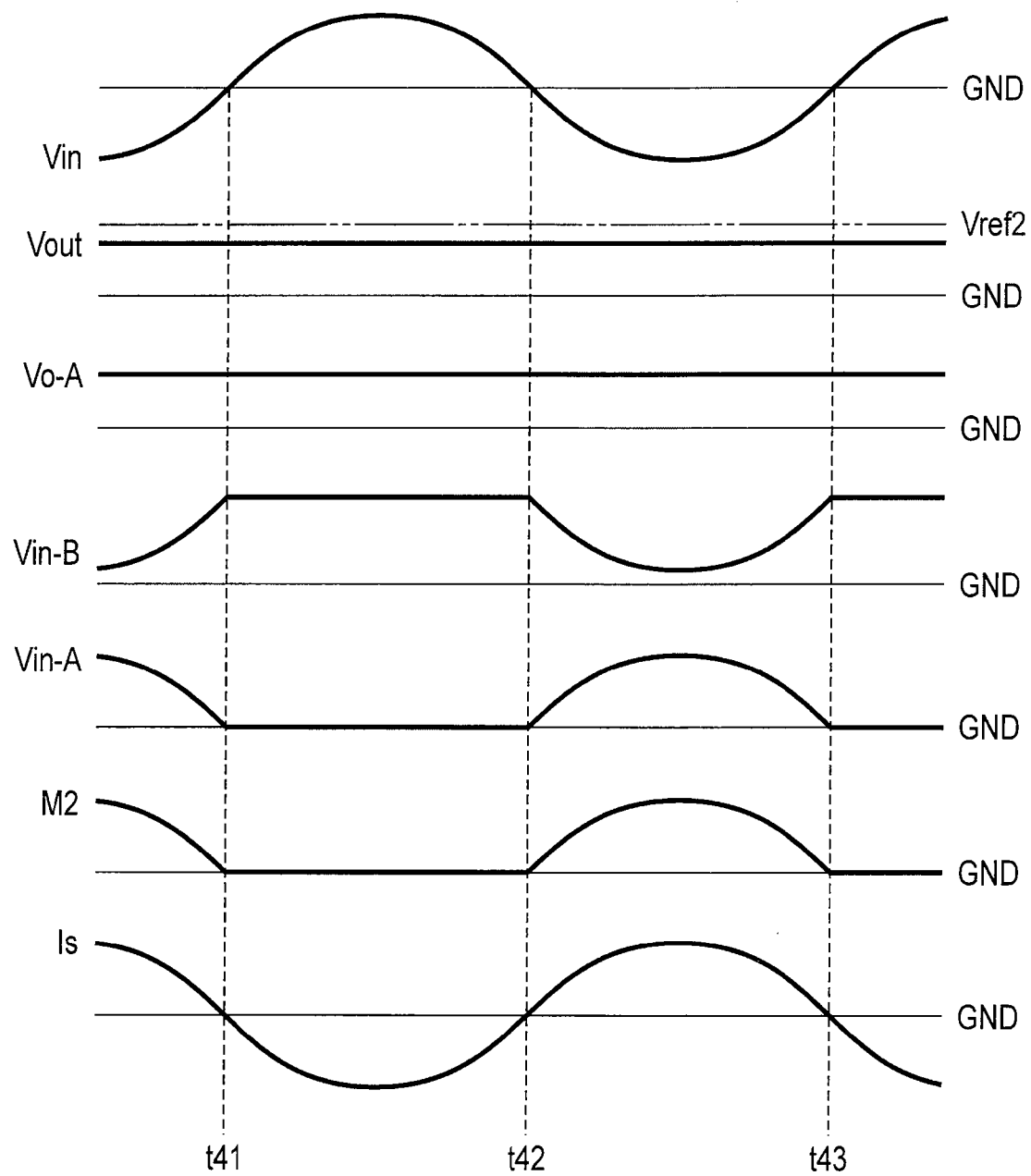
FIG. 8 is a diagram showing operation waveforms when an AC input voltage Vin to a generator and determinator of a controller is negative in the power conversion apparatus.

FIG. 8 shows waveforms of AC input voltage Vin, DC output voltage Vout, amplified output signal Vo-A, bias AC input voltage Vin-B, inverted amplified output signal Vin-A, current command signal M2, and alternating input current Is, from the top to the bottom.

In FIG. 8, the DC output voltage Vout is lower than the second reference voltage Vref2. In this case, the output voltage amplifier circuit 31 outputs a high-level amplified output signal Vo-A.

A negative AC input voltage Vin cannot be used as it is. The second resistance divider circuit 32 generates a bias AC input voltage Vin-B by applying a positive bias voltage to the AC input voltage Vin.

The input voltage amplifier circuit 33 compares the bias AC input voltage Vin-B with the third reference voltage Vref3, and supplies an inverted amplified output signal Vin-A to the second multiplexer 35. Therefore, when the level of the inverted amplified output signal Vo-A is high, current command signal M2 output from the second multiplexer 35 becomes sinusoidal similar to the waveform of the inverted amplified output signal Vin-A, as shown in FIG. 8. The sinusoidal waveform of current command signal M2 becomes an envelope curve that is a target of the alternating input current Is in a negative section.

The current detector 16 detects a circuit current downstream of ground potential GND. Therefore, in a section where the AC input voltage Vin is negative, the detection signal of alternating input current Is becomes positive, and it can be used as it is.

The second current amplifier circuit 43 amplifies the difference between the alternating input current Is and current command signal M2, and outputs an amplified output signal CA2. The level of amplified output signal CA2 is high when current command signal M2 is lower than the alternating input current Is, and low when it is higher than the alternating input current Is.

The third comparator 45 compares the triangular cyclic signal Vosc generated by the oscillator 18 with amplified output signal CA2, and generates a pulse signal PL2. FIG. 9 shows an example of pulse signal PL2 generated when the level of amplified output signal CA2 is high. FIG. 10 shows an example of pulse signal PL2 generated when the level of amplified output signal CA2 is low.

Figure 9:
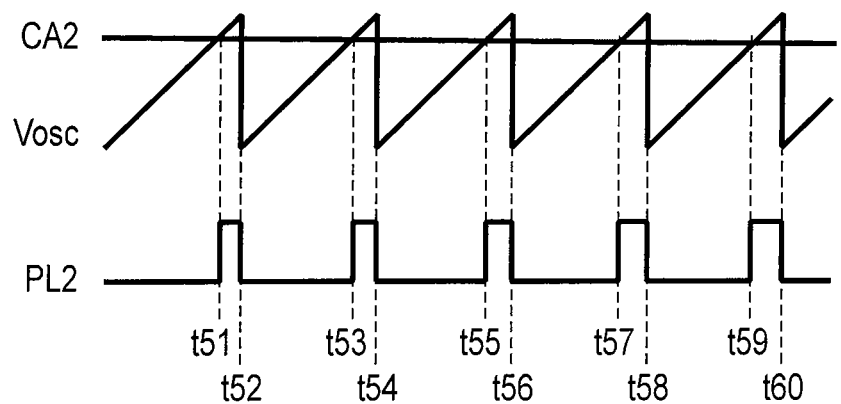
FIG. 9 is a diagram showing an example of a pulse signal PL2 generated when an amplified output signal CA2 is high in the power conversion apparatus.
Figure 10:
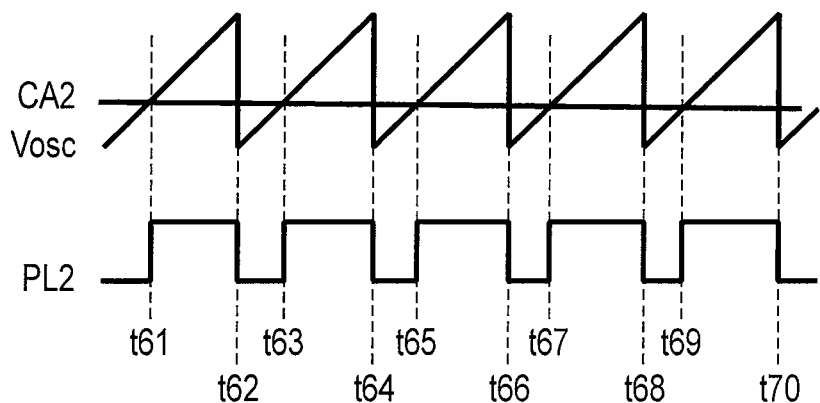
FIG. 10 is a diagram showing an example of a pulse signal PL2 generated when an amplified output signal CA2 is low in the power conversion apparatus.

Pulse signal PL2 turns on when the cyclic signal Vosc becomes higher than amplified output signal CA2 (at times t51, t53, t55, t57 and t59 in FIG. 9, and times t61, t63, t65, t67 and t69 in FIG. 10), and turns off when the cyclic signal Vosc becomes lower than amplified output signal CA2 (at times t52, t54, t56, t58 and t60 in FIG. 9, and times t62, t64, t66, t68 and t70 in FIG. 10).

As seen by comparing FIG. 9 and FIG. 10, the pulse width of pulse signal PL2 decreases when the level of amplified output signal CA2 is high, and increases when the level of amplified output signal CA2 is low.

In other words, the level of amplified output signal CA2 increases when the level of current command signal M2 is lower than the level of the alternating input current Is, and the pulse width of pulse signal PL2 decreases. In contrast, the level of amplified output signal CA2 decreases when the level of current command signal M2 is higher than the level of the alternating input current Is, and the pulse width of pulse signal PL2 increases.

Returning again to FIG. 3, the selector 50 comprises a first AND gate 51, and a second AND gate 52.

The first AND gate 51 ANDs the phase signal Ph from the first comparator 22 and pulse signal PL1 from the second comparator 44. The operation result of the first AND gate 51 is output as a first pulse signal P1.

The second AND gate 52 calculates AND of the inverted phase signal /Ph from the inverter 23 and pulse signal PL2 from the third comparator 45. The operation result of the second AND gate 52 is output as a second pulse signal P2.

Figure 11:
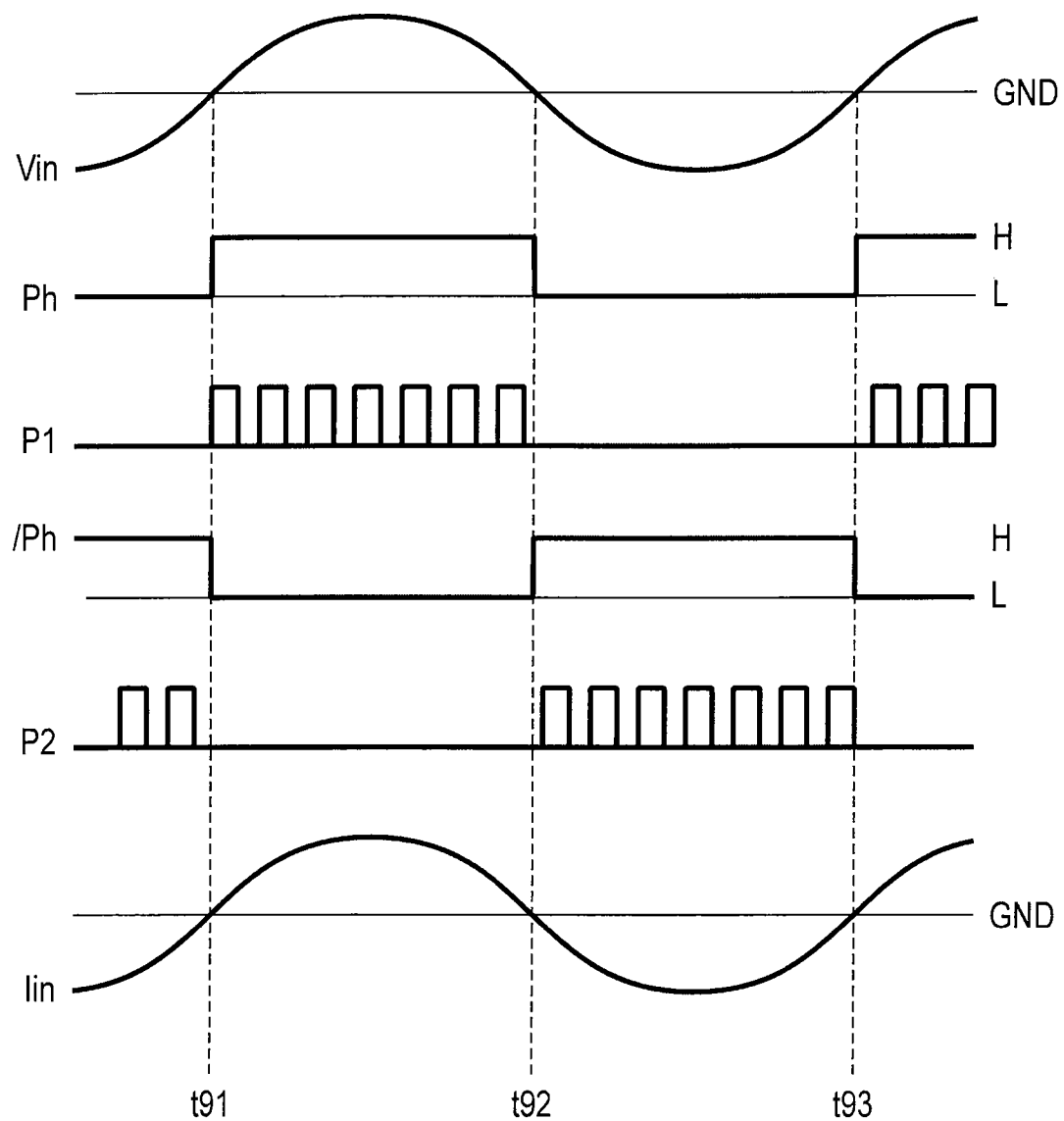
FIG. 11 is diagram showing operation waveforms of a selector 50 in a controller in the power conversion apparatus.

FIG. 11 shows operation waveforms of the selector 50. FIG. 11 shows waveforms of AC input voltage Vin, phase signal Ph, first pulse signal P1, inverted phase signal /Ph, second pulse signal P2, and alternating input current Is, from the top to the bottom.

As shown in FIG. 11, the phase signal Ph is logical 1 in a section where the AC input voltage Vin is positive (t91 to t92 in FIG. 9). At this time, the selector selects pulse signal PL1. The inverted phase signal /Ph is logical 1 in a section where the AC input voltage Vin is negative (t92 to t93 in FIG. 9). At this time, the selector selects pulse signal PL2.

The first pulse signal P1 is supplied to the first switching element S1 of the converter 11. When the first pulse signal P1 turns on, the first switching element S1 conducts. When the first switching element S1 conducts, a closed circuit comprising an AC power supply 13, an inductor L1, a capacitor C1, and a first switching element S1 is formed. As a result, a current flows from the capacitor C1 to the first switching element S1.

When the first pulse signal P1 turns off, the first switching element S1 becomes nonconductive. When the first switching element S1 becomes nonconductive, the current flowing through the first switching element S1 becomes zero. At this time, the inductor L1 tends to cause a current to flow in the same direction by the reactance energy. Therefore, a current flows into the smoothing capacitor C2 through the second diode D2 connected in parallel with the second switching element S2.

Each time the first pulse signal P1 turns on and off, the converter 11 repeats the above operation. As a result, the converter 11 charges the smoothing capacitor C2 while increasing the output voltage Vout across the output terminals 19A and 19B.

The second pulse signal P2 is supplied to the second switching element S2 of the converter 11. When the second pulse signal P2 turns on, the second switching element S2 conducts. When the second switching element S2 conducts, a closed circuit comprising an AC power supply 13, an inductor L1, a capacitor C1, a second switching element S2, and a smoothing capacitor C2 is formed. At this time, the voltage of the smoothing capacitor C2 is higher than the AC input voltage Vin. As a result, the converter 11 operates so that the charging voltage of the smoothing capacitor returns to the AC power supply 13 through the second switching element S2 and inductor L1. Therefore, a current flows from the smoothing capacitor C2 to the second switching element S2.

When the second pulse signal P2 turns off, the second switching element S2 becomes nonconductive. When the second switching element S2 becomes nonconductive, the current flowing through the second switching element S2 becomes zero. At this time, the inductor L1 tends to cause a current to flow in the same direction by the reactance energy. Therefore, a current flows into the capacitor C1 through the first diode D1 connected in parallel with the first switching element S1.

Each time the second pulse signal P2 turns on and off, the converter 11 repeats the above operation. As a result, the converter 11 recharges the capacitor C1.

The polarity of the AC input voltage Vin alternately becomes positive and negative. Therefore, the converter 11 alternately charges the smoothing capacitor C2 and recharges the capacitor C1. In other words, the converter 11 charges the smoothing capacitor C2 after recharging the capacitor C1. Therefore, when the smoothing capacitor C2 is charged, the charge stored in the capacitor C1 is moved to the smoothing capacitor C2.

If the first and second switch elements S1 and S2 do not operate, the circuit of the power conversion apparatus 100 shown in FIG. 1 functions as a voltage doubler circuit. In other words, when the input voltage is 100V AC, for example, a DC voltage of about 200V is generated across the output terminals 102 and 103.

As described above, when the first and second switch elements. S1 and S2 operate, the charge stored in the capacitor C1 is moved to the smoothing capacitor C2. Therefore, the pressor effect of the power conversion apparatus 100 is added. As a result, the power conversion apparatus 100 increases the input AC voltage Va to more than double the input voltage, and obtains a DC output voltage Vout substantially equal to the reference voltage Vref.

As described above, according to the embodiment, the power conversion apparatus 100 can supply power to the load 14 by converting the AC voltage obtained from the AC power supply 13 to a DC voltage without full-wave rectification. A diode bridge circuit for full-wave rectification becomes unnecessary, the number of circuit components is reduced, and the cost is reduced. Further, in the power conversion apparatus 100, a loss caused by a forward voltage generated in a diode bridge is eliminated, and efficient power conversion is possible.

Further, in the power conversion apparatus 100, the input current is controlled to have a sinusoidal waveform similar to the waveform of the input voltage. Therefore, the input current becomes a sinusoidal wave. This prevents harmonics in the input current, and realizes power conversion with minimum noise.

Generally, a power factor converter (PFC) is necessary to prevent harmonics in an input current. In the power conversion apparatus 100, a power factor converter is unnecessary. In other words, the power conversion apparatus 100 realizes the functions of full-wave rectifier and power factor converter by one circuit, and increases the conversion efficiency much more.

Modifications of the embodiments described above are explained hereinafter.

For example, in the above embodiments, a mechanical switch is used for the first and second switching element S1 and S2. However, the switching elements S1 and S2 are not limited to a mechanical switch. FIG. 12 shows an example in which an N-channel MOSFET (a semiconductor switch) is used for the first and second switching elements S1 and S2.

A MOSFET is provided with a body diode. Therefore, even if a MOSFET is used for the first and second switching elements S1 and S2, the same functions and effects as those of the above embodiments can be obtained.

Even a semiconductor switch such as a triac having no body diode can be used for the first and second switching elements S1 and S2 by externally providing diodes D1 and D2 as shown in FIG. 1.

Further, in the above embodiments, a feedback loop of the output voltage amplifier circuit 31 and input voltage amplifier circuit 33 comprises one resistor R13 or R16. The feedback loop is not limited to this configuration. It is permitted to use a parallel circuit comprising a capacitor C21 and a capacitor 21, considering the frequency characteristic, as shown in FIG. 13, or a parallel circuit comprising s series circuit comprising a capacitor C21 and resistor 22, and a parallel circuit comprising a resistor R21, as shown in FIG. 14.

Further, in the above embodiments, the periodic signal Vosc generated by the oscillator 18 is a triangular wave. The period signal Vosc is not limited to a triangular wave. For example, the period signal Vosc generated by the oscillator 18 may be a sawtooth wave.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
  a converter which receives AC voltage as an input, and converts the AC voltage into a DC voltage without full-wave rectification by turning on and off a first switching element which operates when the AC voltage is positive, and a second switching element which operates when the AC voltage is negative; and
  a controller which receives the AC input voltage, an alternating input current to the converter, and the DC voltage, as inputs, determines a pulse width of a first pulse signal to turn on the first switching element, and a pulse width of a second pulse signal to turn on the second switching element, and sends the first pulse signal and the second pulse signal to the converter, the controller including:
    a generator that generates a signal to control the alternating input current to be sinusoidal, from the AC input voltage and a difference voltage of the DC voltage to a reference voltage, and
    a determinator that compares a detection signal of the alternating input current with the signal generated by the generator, and determines pulse widths of the first pulse signal and second pulse signal, wherein
    the generator comprises:
      a resistance divider circuit to divide a potential difference between a rated voltage and the AC input voltage, and
      an inverting amplifier circuit to invert he voltage divided by the resistance divider circuit, and wherein the generator generates a first signal to control the alternating input current to be sinusoidal, from the difference voltage and AC input voltage, when the AC input voltage is positive, and generates a second signal to control the alternating input current to be sinusoidal, from the difference voltage and voltage inverted by the inverting amplifier circuit, when the AC input voltage is negative, and the determinator compares a negative signal of the alternating input current with the first signal, and generates the first pulse signal, and compares a positive signal of the alternating input current with the second signal, and generates the second pulse signal.

2. The apparatus of claim 1, wherein:

the determinator includes a resistance divider circuit, which divides a potential difference between a rated voltage and a voltage generated in a current sensing resistor when the alternating input current flows through the current sensing resistor, and determines a voltage signal generated in the current sensing resistor to be a positive signal, when a voltage generated in the current sensing resistor is positive, and determines a voltage signal divided by the resistance divider circuit to be a negative signal, when a voltage generated in the current sensing resistor is negative.

3. The apparatus of claim 1, wherein the controller includes a selector that sends the first pulse signal with a pulse width determined by the determinator to the converter when the AC input voltage is positive, and sends the second pulse signal with a pulse width determined by the determinator to the converter when the AC input voltage is negative.

4. The apparatus of claim 3, wherein the controller includes a determination unit which determines the polarity of the AC input voltage.

5. A power conversion apparatus comprising:

a converter which receives AC voltage as an input, and converts the AC voltage into a DC voltage without full-wave rectification by turning on and off a first switching element which operates when the AC voltage is positive, and a second switching element which operates when the AC voltage is negative; and a controller which receives the AC input voltage, an alternating input current to the converter, and the DC voltage, as inputs, determines a pulse width of a first pulse signal to turn on the first switching element, and a pulse width of a second pulse signal to turn on the second switching element, and sends the first pulse signal and the second pulse signal to the converter, the controller including:

a determination unit that compares a first reference voltage with a voltage divided by a first resistance divider circuit to divide a potential difference between a rated voltage and the AC input voltage, outputs a positive signal when the divided voltage is higher than the reference voltage, and outputs a negative signal when the divided voltage is lower than the reference voltage, a first multiplier that multiplies a voltage signal obtained by amplifying the difference between the DC voltage and a second reference voltage, by a detection signal of the AC input voltage, a second multiplier that multiplies a voltage signal obtained by amplifying the difference between the DC voltage and a second reference voltage, by an inverted signal of a voltage obtained by dividing the potential difference between a rated voltage and the AC input voltage by a second resistance divider circuit, a first current amplifier circuit that compares a voltage signal obtained by dividing the potential difference between a rated voltage and a voltage generated in the current sensing resistor when the alternating input current flows through the current sensing resistor, by a third resistance divider circuit, with an inverted output signal of the first multiplier, and outputs a current amplifying signal to control a pulse width of the first pulse signal so that the voltage signal coincides with the inverted output signal, a second current amplifier circuit that compares a voltage signal generated in the current sensing resistor when the alternating input current flows through the current sensing resistor, with a non-inverted output signal of the second multiplier, and outputs a current amplifying signal to control a pulse width of the second pulse signal so that the voltage signal coincides with the non-inverted output signal, a first pulse generation circuit that generates a pulse signal whose pulse width is controlled by a current amplifying signal output from the first current amplifier circuit, a second pulse generation circuit that generates a pulse signal whose pulse width is controlled by a current amplifying signal output from the second current amplifier circuit, a first AND gate that sends the first pulse signal to the converter by AND of ANDing a pulse signal generated by the first pulse generation circuit and the positive signal output from the determination unit, and a second AND gate that sends the second pulse signal to the converter by ANDing a pulse signal generated by the second pulse generation circuit and the negative signal output from the determination unit.

6. The apparatus of claim 5, wherein the converter connects the first switching element at both ends of the AC power supply through an inductor and capacitor connected in series, and connects the second switching element at both ends of the first switching element through a smoothing capacitor connected in series.

* * * * *